United States Patent [19]
Sasaki et al.

[11] Patent Number: 5,347,324
[45] Date of Patent: Sep. 13, 1994

[54] VIDEO PROJECTOR WITH BATTERY AND REPLACEABLE LAMP UNIT

[75] Inventors: Hidemi Sasaki; Shinji Suzuki, both of Tokyo, Japan

[73] Assignee: Fuji Photo Film Co., Ltd., Kanagawa, Japan

[21] Appl. No.: 904,322

[22] Filed: Jun. 25, 1992

[30] Foreign Application Priority Data

Jun. 27, 1991 [JP] Japan .................. 3-156950

[51] Int. Cl.$^5$ .................. H04N 5/74; H04N 5/64
[52] U.S. Cl. .................. 348/789; 353/74; 353/77; 353/87; 353/119
[58] Field of Search .................. 358/231, 236, 254, 87, 358/60; 353/43, 74, 77, 78, 119, 71, 85; 348/836, 789, 838; H04N 5/74, 5/64; D16/221, 225, 233, 234

[56] References Cited

U.S. PATENT DOCUMENTS

| | | | |
|---|---|---|---|
| 3,761,170 | 9/1973 | Genesky et al. | 353/87 |
| 4,875,064 | 10/1989 | Umeda et al. | 353/78 |
| 4,925,295 | 5/1990 | Ogawa et al. | 353/57 |
| 4,976,429 | 12/1990 | Nagel | 353/122 |
| 5,090,800 | 2/1992 | Ushiro | 353/74 |
| 5,170,196 | 12/1992 | Itoh | 353/122 |
| 5,258,844 | 11/1993 | Nakayama et al. | 358/209 |
| 5,287,132 | 2/1994 | Suzuki et al. | 353/119 |

FOREIGN PATENT DOCUMENTS

| | | | |
|---|---|---|---|
| 0239024 | 9/1987 | European Pat. Off. | H04N 5/74 |
| 292395 | 11/1989 | Japan . | |
| 3283780 | 12/1991 | Japan | H04N 5/74 |
| 4054779 | 2/1992 | Japan | H04N 5/74 |
| 4262686 | 9/1992 | Japan | H04N 5/74 |

*Primary Examiner*—Mark R. Powell
*Assistant Examiner*—Chris Grant
*Attorney, Agent, or Firm*—Sughrue, Mion, Zinn, Macpeak & Seas

[57] ABSTRACT

The present invention permits easy and safe replacement of a lamp, improves stability of a video projector, and provides a compact and lightweight video projector.

A projector driving battery is mounted in a battery mounting section formed in the bottom of a cabinet of a video projector. Therefore, the heavy battery is located in tile bottom of the cabinet. This further stabilizes the video projector. A lamp unit is mounted on a lamp mounting section formed in the back of the cabinet. When the lamp unit is mounted, a power output terminal in the cabinet is connected with a power input terminal of tile lamp unit at the same time. Thereby, when a lamp is replaced, it is unnecessary, unlike conventionally, to open and close a cover or electrically couple the lamp. Specifically, lamps can be changed merely by dismounting and mounting lamp units. Furthermore, a spare lamp unit 20 can be used as a lens cap.

14 Claims, 5 Drawing Sheets

VIDEO PROJECTOR WITH BATTERY AND REPLACEABLE LAMP UNIT

BACKGROUND OF THE INVENTION

1. Field of the Invention

The present invention relates to a video projector, and more particularly, to a video projector for projecting an image displayed on a transmission type liquid crystal panel or other transmission type display means using a projection lens and a projector light source to produce an enlarged image.

2. Description of the Related Art

In general, the foregoing video projector has a lamp (for example, a halogen lamp rated several hundred watts) of large power consumption as a projector light source.

A compact and lightweight video projector that can be driven with a battery has been proposed and put to practical use (Japanese Patent Application No.3-22447 and U.S. patent application Ser. No. 833,731).

In the compact and lightweight video projector, a cover is formed in the back of a cabinet accommodating a projection lens, a transmission type liquid crystal panel, and a lamp so that the lamp can be replaced easily. A battery mounting section for mounting a projector driving battery is formed on tile rear of the cover.

In the foregoing video projector, a heavy battery is mounted in the back portion. Therefore, the weight of the video projection is ill-balanced. Before a lamp is replaced, the cover must be removed. This is a nuisance. When the lamp must be replaced immediately after the lamp fails, there is a risk of being burned with the heat dissipated from the lamp.

SUMMARY OF THE INVENTION

The object of the present invention is to solve the aforesaid problems or to provide a compact and lightweight video projector that permits simple and safe replacement of a lamp, and is battery-driven and stable.

To achieve the foregoing object, the present invention comprises a cabinet, a transmission type display means arranged in the cabinet and displaying an image based on a video signal, a lamp unit arranged in the cabinet, and a battery mounting section formed in the bottom of the cabinet to mount projection driving batteries.

Alternatively, the present invention comprises a cabinet having a lamp mounting section in its back, a projection lens arranged in the cabinet, a transmission type display means arranged in the cabinet and displaying an image based on a video signal, a power output terminal arranged in the cabinet and facing the lamp mounting section, and a lamp unit freely mountable on the lamp mounting section and formed by uniting a lamp and a power input terminal for the lamp. Herein, the power output terminal and power input terminal are connected at the same time when the lamp unit is mounted.

According to the present invention, a projector driving battery is mounted in a battery mounting section formed in the bottom of a cabinet. Thereby, a heavy battery is located in the bottom of the cabinet. This improves stability of a video projector.

According to another mode of the present invention, a lamp unit can be dismounted from a lamp mounting section formed in the back of a cabinet. When the lamp unit is mounted, a power output terminal in the cabinet is connected with a power input terminal of time lamp unit at the same time. Thereby, when a lamp is replaced, it is unnecessary, unlike conventionally, to open and close a cover or electrically couple the lamp. That is to say, lamps can be changed merely by dismounting and mounting lamp units.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of a video projector according to the present invention with reference to the accompanying drawings.

Figure 1:
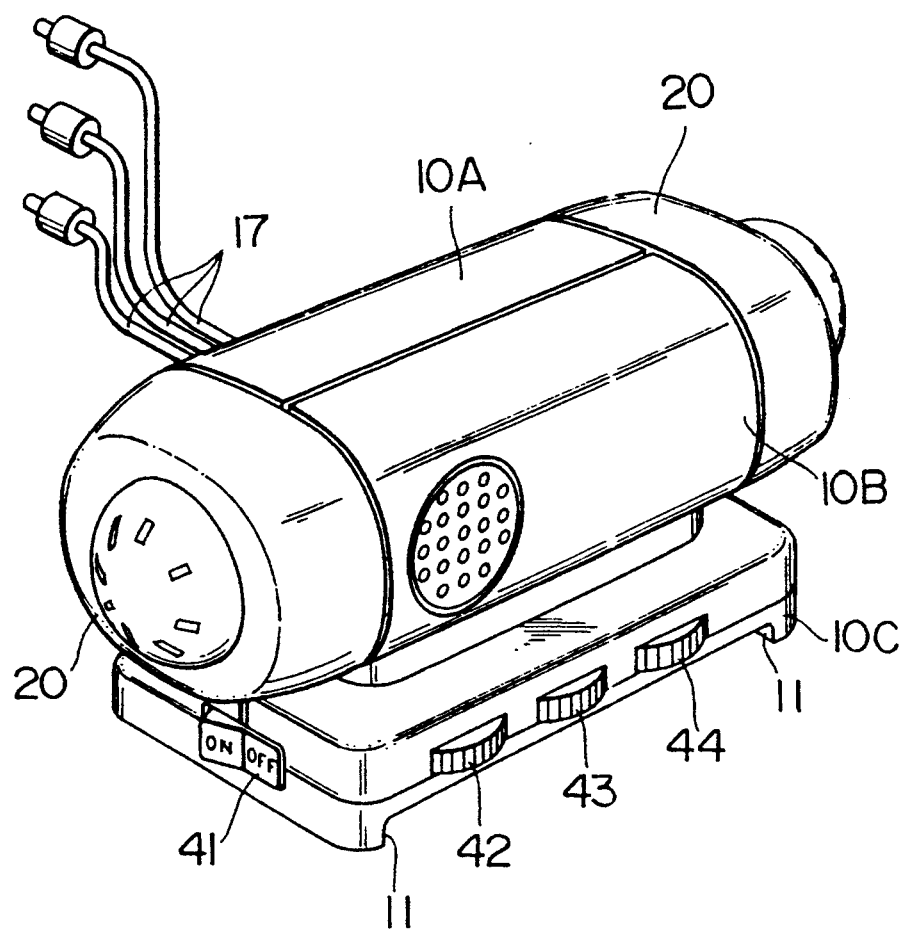
FIG. 1 is an oblique view showing the appearance of a video projector according to tile present invention.
Figure 2:
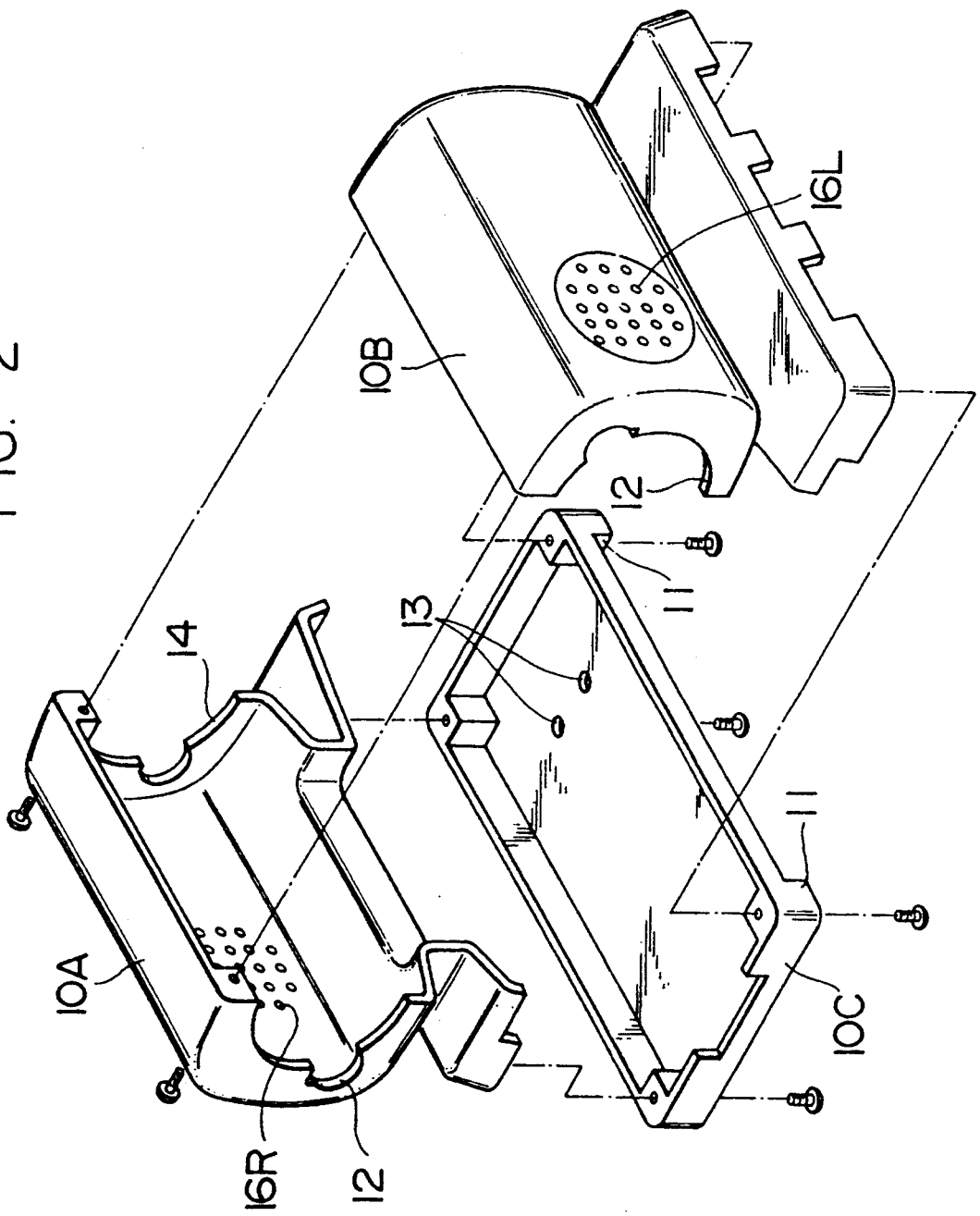
FIG. 2 is an exploded view of a cabinet of the video projector.
Figure 3:
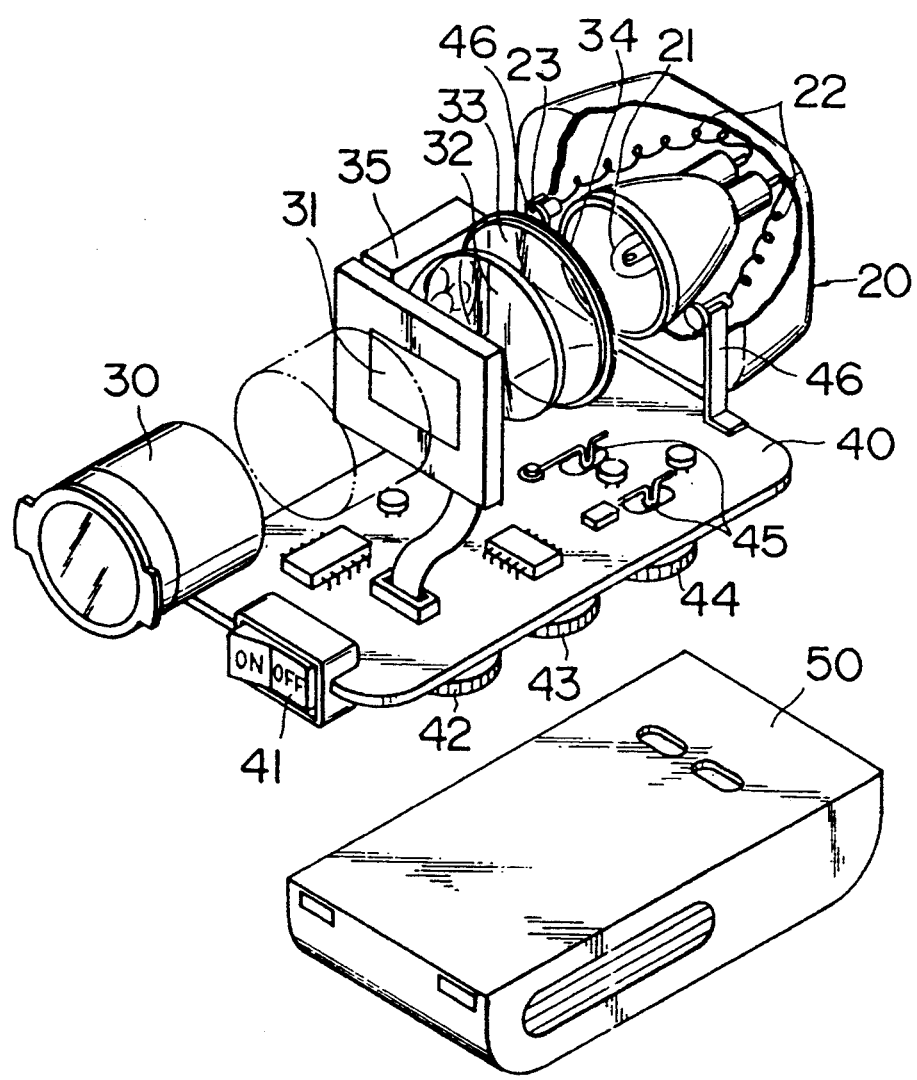
FIG. 3 is an oblique view of equipment arranged in the cabinet of the video projector.

FIG. 1 is an oblique view showing the appearance of a video projector according to the present invention. FIG. 2 is an exploded view of a cabinet of the video projector. FIG. 3 is an oblique view showing equipment arranged the cabinet.

As shown in FIG. 2, the video projector has a cabinet made up of outer covers 10A and 10B that are separated left and right, respectively, and a lower cover 10C arranged below the outer covers 10A and 10B.

A lamp mounting section 12 or 14 for mounting a lamp unit 20 is formed in the front or back portions of the left and right outer covers 10A and 10B. Grilles 16R and 16L for stereo speakers are seating tile sides of tile outer covers 10A and 10B.

Figure 4:
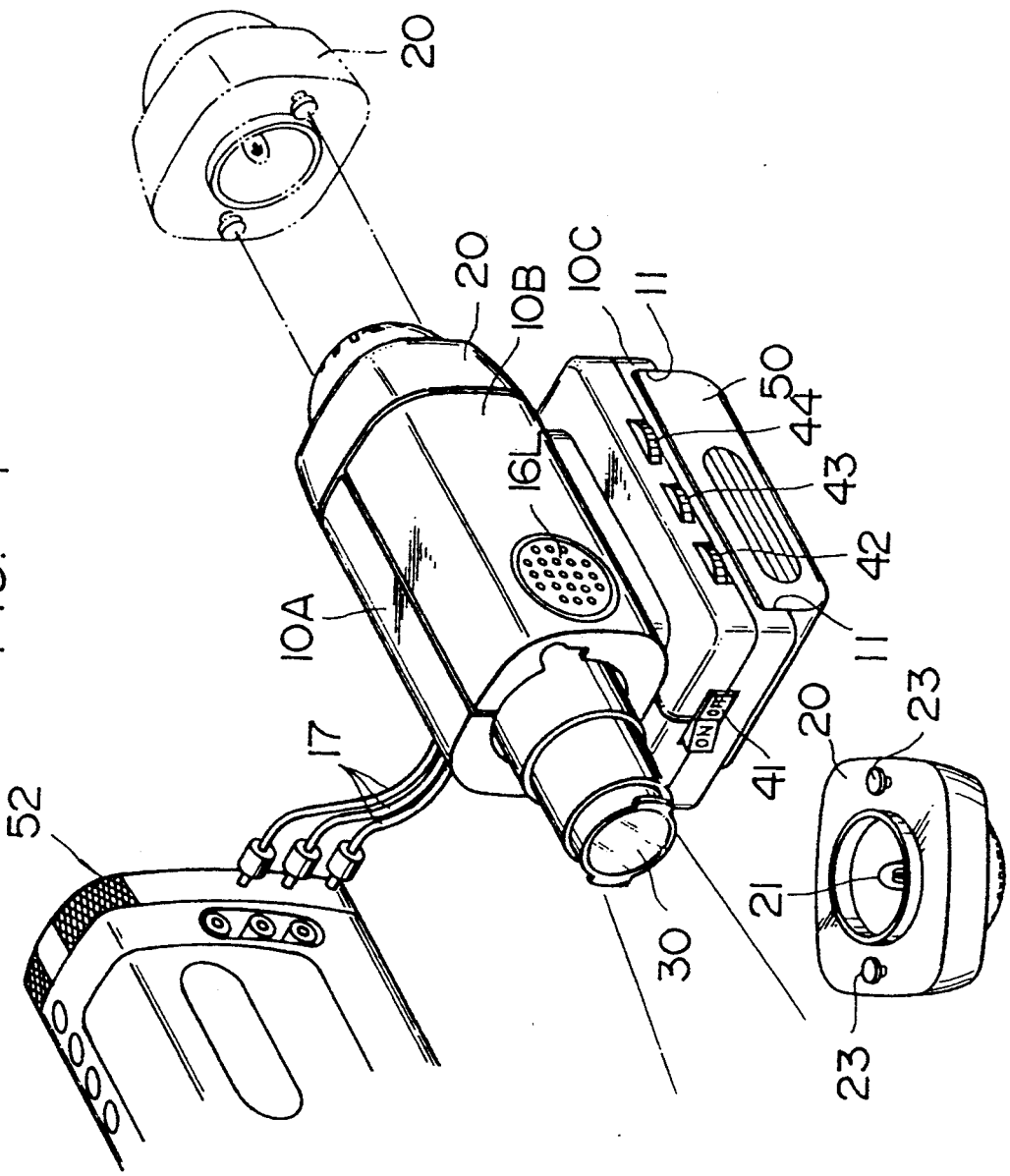
FIG. 4 is an oblique view showing the operating state of the video projector.

In the space enclosed by tile left and right outer covers 10A and 10B, as shown in FIG. 3, a projection lens 30, an optical transmission type liquid crystal panel 31, a polarizing plate 32, a condenser lens 33, and a heat ray cutoff filter 34 are set in array in that order. In the space, a cooling fan 35 for cooling tile liquid crystal panel 31 and stereo speakers that are not shown are also lying. As shown in FIG. 4, the projection lens 30 stretches and contracts freely. When not in use, the projection lens 30 is contracted and stored in tile cabinet.

A battery mounting section 11 for mounting a projector driving battery 50 is formed on the lower side of a lower cover 10C. A printed-circuit board 40 is placed in the lower cover 10C.

On the printed-circuit board 40, a power supply circuit, a voice regeneration circuit, a video regeneration circuit, and a liquid drive circuit are mounted. The printed-circuit board 40 is provided with a Power ON/OFF switch 41, a brightness control dial 42, a hue control dial 43, and a volume control dial 44. Furthermore, two pins 45 servicing as power input terminals are provided. The pins 45 project elastically from holes 13

(FIG. 2) bored on the lower cover 10C, and are electrically coupled to a battery 50 mounted in the battery mounting section 11. A power output terminal 46 for supplying power to the lamp unit 20 is disposed on the printed-circuit board 40. The printed-circuit board 40 is placed in the lower cover 10C. Therefore, once the lower cover 10C is removed, various circuits can be adjusted and maintained effortlessly.

A lamp unit 20 is made up of a 18-W halogen lamp 21 with a mirror and a power input terminal 23 to be connected to the lamp 21 via a wire 22, which are, for example, molded with resin as a unit.

The lamp unit 20 can be mounted on a lamp mounting section 14 formed in the back portions of outer covers 10A and 10B merely by pressing it. More specifically, the power input terminal 23 of the lamp unit 20 is aligned with a given position of the lamp mounting section 14, pressed into the lamp mounting section 14, then rotated by a certain quantity. Thus, the lamp unit 20 is mounted. The lamp unit 20 is dismounted by rotating it in the reverse direction. When the lamp unit 20 is mounted, the power input terminal 23 is connected to a power output terminal 46 in a projection body.

The lamp unit 20 can be mounted on a lamp mounting section 12 formed in the front portions of the outer covers 10A and 10B merely by pressing it. Thereby, a spare lamp unit 20 can be used as a lens cap (See FIG. 1).

FIG. 4 is an oblique view showing the operating state of the aforesaid video projector. As shown in FIG. 4, a battery 50 is mounted in a battery mounting section 11 on the lower side of a lower cover 10C. The battery 50 supplies power for driving a projector. A spare lamp unit 20 having served as a lens cap is removed, and a projection lens 30 is stretching out from the projector body.

The projector body is provided with an input jack that is not shown. Ends of connection cords 17 are inserted into the input jack. Other ends of the connection cords 17 are connected to a video camera 52, a VTR, and other units. Video and voice signals are supplied to a video projector via the connection cords 17.

When a video projector is in use, if the lamp fails, the lamp unit is rotated by a certain quantity, and dismounted from the projector body as indicated with a dot-dash line. Then, the spare lamp unit 20 that has been used as a lens cap is mounted. Thus, changing lamps is complete.

While lamps are being changed, the lamps themselves are not brought into contact with hands. This eliminates a risk of burning. After use of a video projector, a projection lens 30 is contracted and stored in the projector body. Thus, the video projector becomes more compact.

Figure 5:
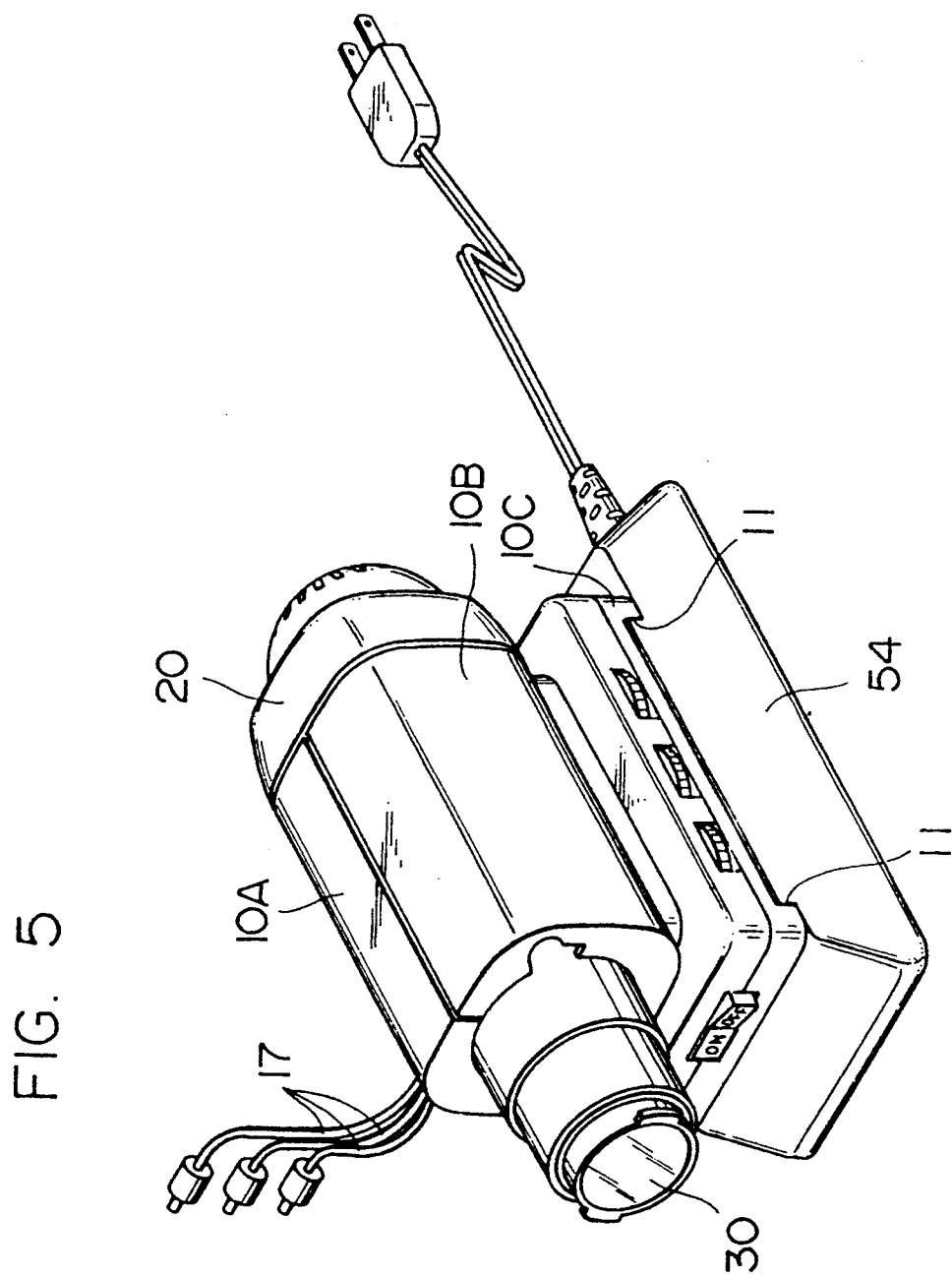
FIG. 5 is an oblique view showing other operating state of the video projector.

FIG. 5 is an oblique view showing another operating state of a video projector. As shown in FIG. 5, an AC coupler 54 that enables the use of a main power supply is mounted on behalf of a battery 50 in a battery mounting section 11 on the lower side of a lower cover 10C. This makes it possible to drive the video projector for a prolonged period of time.

As described previously, according to a video projector in which the present invention is implemented, an external battery can be mounted in the bottom of a cabinet. Therefore, a heavy battery is located in the bottom of the cabinet. This further stabilizes the video projection. A lamp unit in which a lamp and a power input terminal for the lamp are united can be mounted externally on the back of a projector body, and electrically coupled at the same time. This permits easy and safe replacement of a lamp. Moreover, a spare lamp unit also serves as a lens cap. A projection lens stretches and contracts freely. When not in use, the projection lens can be contracted and stored in the cabinet. Thus, a more compact and lightweight video projector is realized.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A video projector, comprising:
   a cabinet;
   a projection lens arranged in said cabinet;
   a transmission type display means arranged in said cabinet and displaying an image based on a video signal;
   a lamp unit arranged in said cabinet; and
   a battery mounting section formed on the bottom of said cabinet to mount a projector driving battery so that said projector sits on top of said battery so that said battery provides increased stability to said projector when mounted.

2. A video projector, comprising:
   a cabinet;
   a projection lens arranged in said cabinet;
   a transmission type display means arranged in said cabinet and displaying an image based on a video signal;
   a lamp unit arranged in said cabinet; and
   a battery mounting section formed on the bottom of said cabinet to mount a projector driving battery so that said battery provides increased stability to said projector when mounted,
   wherein said cabinet includes outer covers that are separated right and left, and a lower cover arranged below the outer covers.

3. A video projector according to claim 2 wherein said cabinet has a neck in its substantial and vertical center, said projection lens and transmission type display means arranged above said neck, and a circuit board arranged beneath said neck on the opposite side of said lower cover.

4. A video projector, comprising:
   a cabinet having a lamp mounting section in its back;
   a projection lens arranged in said cabinet;
   a transmission type display means arranged in said cabinet and displaying an image based on a video signal;
   a power source output terminal arranged in said cabinet and facing said lamp mounting section; and
   a lamp unit freely mountable on said lamp mounting section and formed by uniting a lamp and a power input terminal for the lamp, said lamp being a halogen lamp with a mirror, and said lamp unit comprising said halogen lamp with a mirror and said power input terminal, molded with resin as a unit;
   wherein said power source output terminal and said power input terminal are connected when said lamp unit is mounted.

5. A video projector according to claim 4 wherein said lamp unit also serves as a lens cap.

6. A video projector according to claim 4 wherein said projection lens stretches and contracts freely so that said projection lens will stretch out from said cabinet when in use and contract to enter said cabinet when not in use.

7. A video projector, comprising:
a cabinet having a lamp mounting section in its back;
a projection lens arranged in said cabinet;
a transmission type display means arranged in said cabinet and displaying an image based on a video signal;
a power source output terminal arranged in said cabinet and facing said lamp mounting section;
a battery mounting section formed on the bottom of said cabinet to mount a projector driving battery so that said projector sits on top of said battery so that said battery provides increased stability to said projector when mounted; and
a lamp unit freely mounted on said lamp mounting section and formed by uniting a lamp and a power input terminal for said lamp;
said power source output terminal and said power input terminal being connected when said lamp unit is mounted.

8. A video projector, comprising:
a cabinet having a lamp mounting section in its back;
a projection lens arranged in said cabinet;
a transmission type display means arranged in said cabinet and displaying an image based on a video signal;
a power source output terminal arranged in said cabinet and facing said lamp mounting section;
a battery mounting section formed on the bottom of said cabinet to mount a projector driving battery so that said battery provides increased stability to said projector when mounted; and
a lamp unit freely mounted on said lamp mounting section and formed by uniting a lamp and a power input terminal for said lamp;
said power source output terminal and said power input terminal being connected when said lamp unit is mounted,
wherein said cabinet includes outer covers that are separated right and left and a lower cover arranged below said outer covers.

9. A video projector according to claim 8, wherein said cabinet has a neck in its substantial and vertical center, said projection lens and transmission type display means, being arranged above said neck, and a circuit board arranged beneath said neck on the opposite side of said lower cover, with said power source output terminal disposed on said circuit board extending up from said circuit board.

10. A video projector according to claim 9 wherein said lamp is a halogen lamp with a mirror, and said lamp unit is made up of said halogen lamp with a mirror and said power input terminal that are molded with resin as a unit.

11. A video projector according to claim 10 wherein said spare lamp unit also serves as a lens cap.

12. A video projector according to claim 11 wherein said projection lens stretches and contracts freely so that said projection lens will stretch out from said cabinet when in use and contract to enter said cabinet when not in use.

13. A video projector, comprising:
a cabinet having a lamp mounting section in its back;
a projection lens arranged in said cabinet;
a transmission type display means arranged in said cabinet and displaying an image based on a video signal;
a power source output terminal arranged in said cabinet and facing said lamp mounting section; and
a lamp unit freely mountable on said lamp mounting section and formed by uniting a lamp and a power input terminal for the lamp,
said power source output terminal and said power input terminal being connected when said lamp unit is mounted; and
wherein said lamp unit also serves as a lens cap.

14. A video projector, comprising:
a cabinet having a lamp mounting section in its back;
a projection lens arranged in said cabinet;
a transmission type display means arranged in said cabinet and displaying an image based on a video signal;
a power source output terminal arranged in said cabinet and facing said lamp mounting section; and
a lamp unit freely mountable on said lamp mounting section and formed by uniting a lamp and a power input terminal for the lamp,
said power source output terminal and said power input terminal being connected when said lamp unit is mounted; and
wherein said projection lens stretches and contracts freely so that said projection lens will stretch out from said cabinet when in use and contract to enter said cabinet when not in use.

* * * * *